(12) United States Patent
Knackert et al.

(10) Patent No.: US 12,359,944 B2
(45) Date of Patent: Jul. 15, 2025

(54) SENSOR CASING AND METHOD FOR POTTING AN OPEN RECEIVING SPACE OF A SENSOR CASING

(71) Applicant: Robert Bosch GmbH, Stuttgart (DE)

(72) Inventors: Stephan Knackert, Haldenwang (DE); Thomas Breinlinger, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 17/793,856

(22) PCT Filed: Jan. 20, 2021

(86) PCT No.: PCT/EP2021/051137
§ 371 (c)(1),
(2) Date: Jul. 19, 2022

(87) PCT Pub. No.: WO2021/148438
PCT Pub. Date: Jul. 29, 2021

(65) Prior Publication Data
US 2023/0060087 A1    Feb. 23, 2023

(30) Foreign Application Priority Data
Jan. 24, 2020 (DE) ..................... 10 2020 200 848.5

(51) Int. Cl.
*G01D 11/24* (2006.01)
*B29C 39/10* (2006.01)
*B29L 31/00* (2006.01)

(52) U.S. Cl.
CPC ............ *G01D 11/245* (2013.01); *B29C 39/10* (2013.01); *B29L 2031/752* (2013.01)

(58) Field of Classification Search
CPC . G01D 11/245; B29C 39/10; B29L 2031/752; B29K 2995/0094; H05K 5/0056; H05K 5/0091
(Continued)

(56) References Cited

U.S. PATENT DOCUMENTS

2005/0092076 A1* 5/2005 Uleski ................ B60C 23/0408
  73/146.8
2007/0187136 A1 8/2007 Higashiguchi et al.
2012/0043570 A1 2/2012 Nakashima et al.

FOREIGN PATENT DOCUMENTS

CH      619 333 A5    9/1980
DE  10 2006 056 361 A1  6/2008
(Continued)

OTHER PUBLICATIONS

Manufacturing Engineering Technology, Oct. 2011.*
(Continued)

*Primary Examiner* — Robert R Raevis
(74) *Attorney, Agent, or Firm* — Maginot, Moore & Beck LLP

(57) ABSTRACT

A sensor casing is disclosed that has an open receiving space which has a peripheral edge as a creep barrier at the open end. The receiving space is filled with a potting compound. The cured potting compound forms a concave surface with respect to the peripheral edge. A method for potting an open receiving space of a sensor casing of this kind is also disclosed. The peripheral edge has an outwardly declining slope which allows temporary overfilling of the receiving space during a potting process so as to form a stable convex potting compound surface.

9 Claims, 3 Drawing Sheets

(58) Field of Classification Search
USPC .... 73/488, 493, 494, 756, 431; 29/592–595,
29/469, 739, 841, 855; 361/535–539;
439/936
See application file for complete search history.

(56) References Cited

FOREIGN PATENT DOCUMENTS

| | | | | |
|---|---|---|---|---|
| DE | 102008021108 A1 | * | 11/2009 | ........... B81B 7/0061 |
| DE | 10 2008 042 489 B4 | | 4/2010 | |
| DE | 10 2014 222 899 A1 | | 5/2016 | |
| DE | 102016100479 A1 | * | 7/2017 | ........... G01D 11/245 |
| JP | S61-102757 A | | 5/1986 | |
| JP | H02189411 A | * | 7/1990 | |
| JP | H5-29650 A | | 2/1993 | |
| JP | H7-22755 A | | 1/1995 | |
| JP | 2002-314143 A | | 10/2002 | |
| JP | 2006-100489 A | | 4/2006 | |
| JP | 2010-80268 A | | 4/2010 | |
| JP | 2017-59715 A | | 3/2017 | |
| JP | 7153871 B2 | | 10/2022 | |
| WO | 2016/075104 A1 | | 5/2016 | |
| WO | 2019/124024 A1 | | 6/2019 | |

OTHER PUBLICATIONS

International Search Report corresponding to PCT Application No. PCT/EP2021/051137, mailed Mar. 4, 2021 (German and English language document) (5 pages).

\* cited by examiner

SENSOR CASING AND METHOD FOR POTTING AN OPEN RECEIVING SPACE OF A SENSOR CASING

This application is a 35 U.S.C. § 371 National Stage Application of PCT/EP2021/051137, filed on Jan. 20, 2021, which claims the benefit of priority to Serial No. DE 10 2020 200 848.5, filed on Jan. 24, 2020 in Germany, the disclosures of which are incorporated herein by reference in their entirety.

The disclosure relates to a sensor casing. The present disclosure further relates to a method for potting an open receiving space of a sensor casing of this kind.

BACKGROUND

It is known from the prior art for electronic components to be potted using sealing compounds such as epoxides and silicones, for example, in order to protect against humidity, corrosion and electrical shunt. Consequently, it is common practice for an open receiving space in a sensor casing, which receives electronic components of the sensor, to be filled with an epoxy resin compound or a silicon compound, in order to protect against humidity, corrosion, electrical shunts, etc.

Particularly in the case of compact sensors, such as a speed sensor, for example, the combination of the capillarity of small dimensions, a complex geometry and/or concave edges and a hydrophilic wetting behavior can cause the potting compound to run off during the potting process. This may result in the contamination of products and facilities with potting compound.

A workpiece composite for a pressure sensor is known from DE 10 2008 042 489 B4. The workpiece composite comprises a preform and a gel which is received in a recess in the preform. The recess is enclosed by at least one edge acting as a creep barrier, in order to prevent the gel from spreading. At least one area closed off by the edge is provided with a coating made of an oleophobic material in a region adjacent to the edge. The coating of an oleophobic material prevents the gel from creeping into this area.

SUMMARY

The sensor casing having the features of the independent patent claim 1 has the advantage that the circumferential edge is suitable for holding the potting compound in the defined region. In this way, the circumferential edge prevents the potting compound from running out and contaminating the product and facility due to the outwardly descending slope. In addition, a permitted temporary overfilling of the receiving space allows a stable and robust potting process with quicker cycle times.

Furthermore, exemplary embodiments of the sensor casing according to the disclosure in the region of the open receiving space have a simple geometry that can easily be transferred to different design variants which may differ in terms of sensor length, sensor width, number of electronic components, for example. In addition, the sensor casing can be produced as an expendable injection-molded part.

Embodiments of the present disclosure provide a sensor casing with an open receiving space, which has a circumferential edge at the open end as a creep barrier. The receiving space is filled with a potting compound, wherein the hardened potting compound forms a concave surface to the circumferential edge. In this case, the circumferential edge has an outwardly descending slope which allows temporary overfilling of the receiving space during a potting process, forming a stable convex potting compound surface.

In addition, a method is proposed for potting an open receiving space of a sensor casing of this kind. In this case, the receiving space is filled with potting compound until a stable convex potting compound surface is formed at a circumferential edge of the open end. The potting compound filling is then hardened.

Embodiments of the sensor casing can preferably be used in compact speed sensors. Embodiments of the sensor casing can of course also be used for other compact sensors.

Through the measures and developments specified in the dependent claims, advantageous improvements of the sensor casing specified in independent patent claim 1 are possible.

It is particularly advantageous for edges of the receiving space to be able to be configured as fillets in the ascending direction. Hence, the receiving space may have a rectangular base area with round or concave corner regions, for example. In addition, the receiving space may have at least one rounded or concave indentation or at least one rounded or concave projection. The fillets formed in the ascending direction of the potting compound mean that sharp edges are avoided, which can favor a run-off of the potting compound during the potting process.

In an advantageous embodiment of the sensor casing, the outwardly descending slope may have a slope angle in the range of 20° to 70°, preferably a slope angle of 45°. In addition, the circumferential edge may have a height in the range of 0.1 to 1 mm.

In a further advantageous embodiment of the sensor casing, the receiving space may receive at least one electronic component of a sensor, which can be protected by the hardened potting compound. The at least one electronic component may be configured as an ASIC component (ASIC: Application-Specific Integrated Circuit), for example.

Exemplary embodiments of the disclosure are depicted in the drawing and are explained in greater detail in the following description. In the drawing, the same reference signs denote components or elements which perform the same or similar functions.

DETAILED DESCRIPTION

Figure 1:
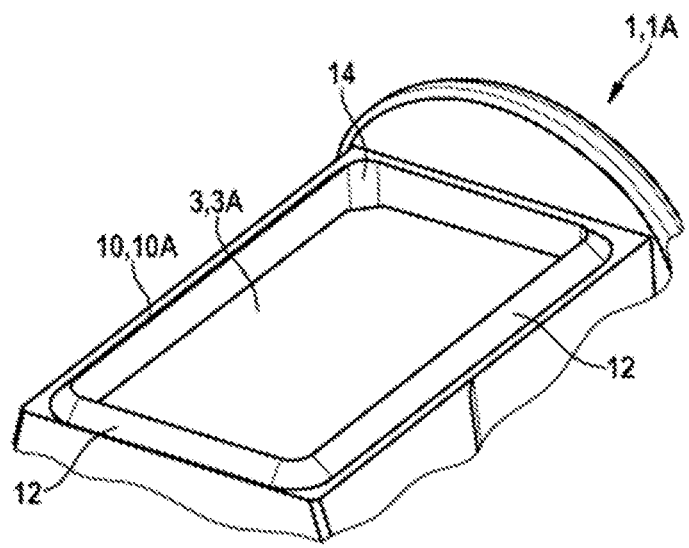
FIG. 1 shows a schematic perspective representation of a cutout of a first exemplary embodiment of a sensor casing according to the disclosure without a receiving space filled with potting compound.

As can be seen from FIGS. 1 to 5, the exemplary embodiments shown of a sensor housing 1, 1A, 1B according to the disclosure each comprise an open receiving space 3, 3A, 3B. The receiving space 3, 3A, 3B has a circumferential edge 10, 10A, 10B at an open end acting as a creep barrier for a potting compound 16 filling. In this case, the circumferential edge 10, 10A, 10B has an outwardly descending slope 12 which, during a potting process, allows a temporary overfilling of the receiving space 3, 3A, 3B with potting compound 16, forming a stable convex potting compound surface 16A.

Figure 2:
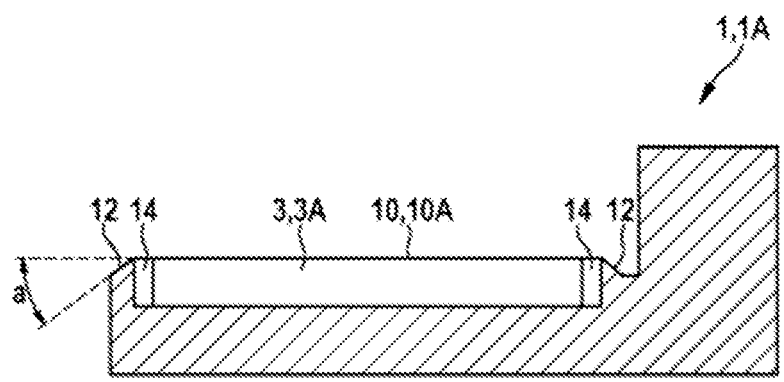
FIG. 2 shows a schematic sectional depiction of the sensor casing according to the disclosure from FIG. 1.

FIGS. 1 and 2 show the receiving space 3, 3A, 3B prior to the potting process or prior to the filling with potting compound 16.

Figure 3:
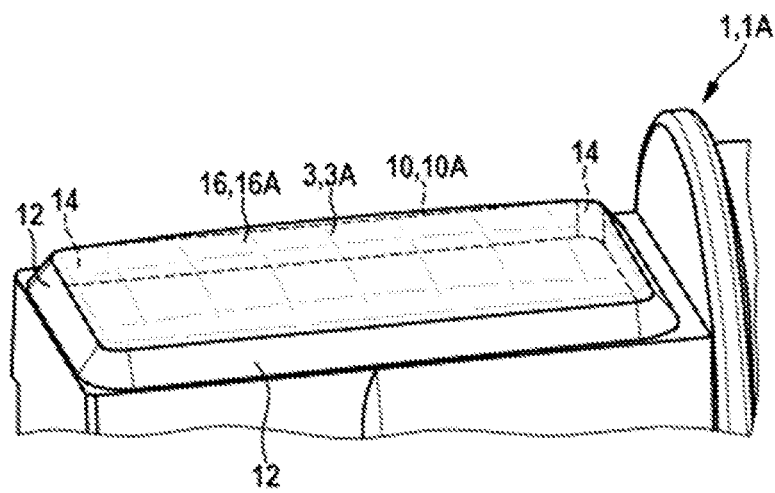
FIG. 3 shows a schematic perspective representation of the sensor casing according to the disclosure from FIG. 1 with the receiving space filled with a potting compound.
Figure 4:
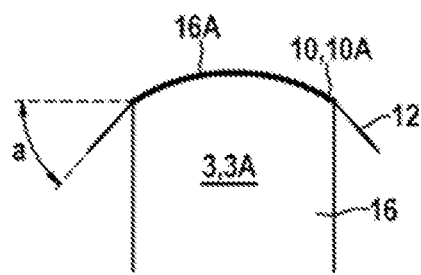
FIG. 4 shows a schematic sectional depiction of the sensor housing according to the disclosure from FIG. 3.

In accordance with the method according to the disclosure for potting an open receiving space 3, 3A, 3B of a sensor casing 1, 1A, 1B of this kind, the receiving space 3, 3A, 3B is filled with potting compound 16 until a stable convex potting compound surface 16A depicted in FIGS. 3 and 4 is formed at the circumferential edge 10, 10A, 10B of the open end. The potting compound 16 filled in the receiving space 3, 3A, 3B is then hardened. During the hardening process, the potting compound 16 with which the receiving space 3, 3A, 3B is filled is distributed and also flows into hollow cavities and undercuts in the receiving space 3, 3A, 3B which are not shown. Following the hardening process, the hardened potting compound 16 in the receiving space 3, 3A, 3B forms a concave surface to the circumferential edge 10, 10A, 10B.

Figure 6:
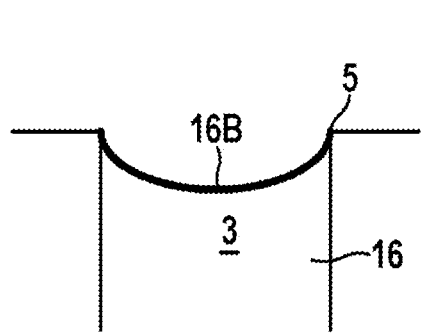
FIG. 6 to FIG. 8 each show a schematic sectional representation of a cutout of a receiving space with a traditional circumferential edge known from the prior art and potting compound filling.
Figure 7:
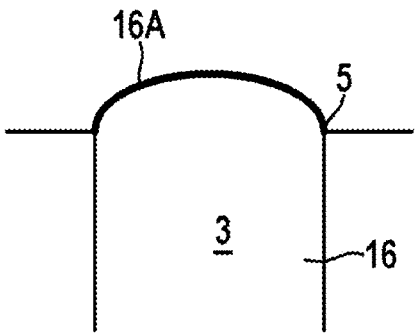
Figure 8:
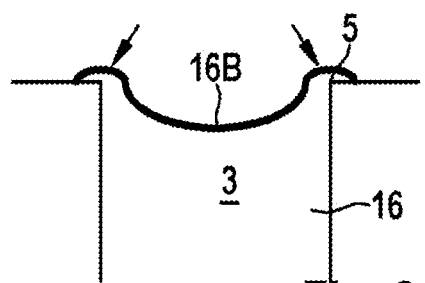

As is further evident from FIGS. 6 to 8, the receiving space 3 shown has a traditional circumferential edge 5 known from the prior art without an outwardly descending slope 12. In this case, FIG. 6 shows a stable state in which the potting compound 16 filling forms a concave potting compound surface 16B to the circumferential traditional edge 5. As is further evident from FIG. 7, the potting compound 16 filled in the receiving space 3 forms an unstable convex potting compound surface 16A when there is overfilling, which runs out over the traditional edge 5 onto the adjacent area of the receiving space 3 when a material-related contact angle is exceeded, as can be seen from FIG. 8. The runout of the potting compound 16 allows the return to a stable state and formation of the concave potting compound surface 16B to the circumferential traditional edge 5. A liquid front or the overflowing potting compound 16 remains until the material-related contact angle is filled by comparison with the next area, in this case the adjacent area of the receiving space. This means that the traditional circumferential simple edge 5 at an angle of 90° to the adjacent area, holds the potting compound 16 in the inside of the receiving space 3 only as long as the receiving space 3 is not overfilled.

As can also be seen from FIGS. 3 and 4, the circumferential edge 10A of the sensor casing 1A according to the disclosure, unlike the traditional edge 5 from FIGS. 6 to 8, displays a slope angle a in the region of 20° to 70° relative to the next area, in this case the slope 12, on account of the outwardly descending slope 12. This allows an overfilling of the receiving space 3A, 3B and formation of the stable convex potting surface 16A during the potting process, without the potting compound 18 running out of the receiving space 3A.

As can be seen from FIGS. 1 to 3 and 5, edges of the receiving space 3, 3A, 3B are formed as fillets in the ascending direction. In this way, sharp edges which favor the outflow of potting compound 16 from the receiving space 3, 3A, 3B during the potting process, are avoided in the receiving space 3, 3A, 3B.

As can also be seen from FIGS. 1 to 3, the receiving space 3A in the first exemplary embodiment of the sensor housing 1A shown has a rectangular base area with round corner regions. This means that the four corner regions of the receiving space 3A are formed as fillets.

Figure 5:
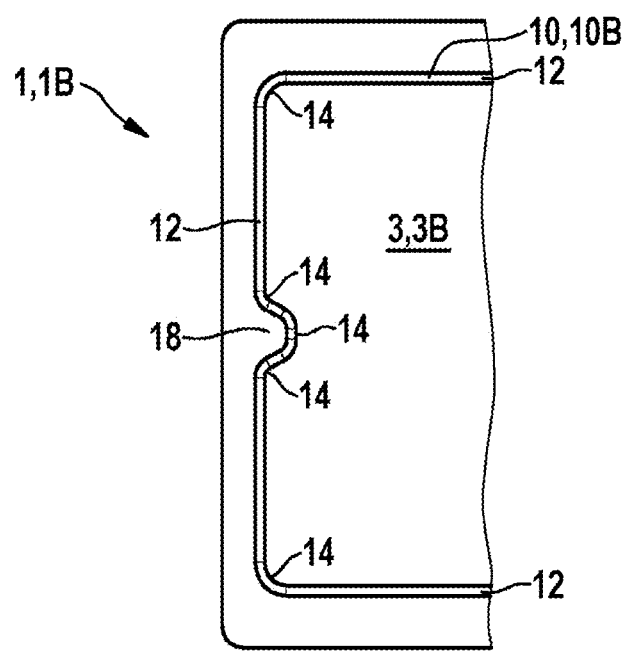
FIG. 5 shows a schematic plan view of a detail of a second exemplary embodiment of a sensor casing according to the disclosure without a receiving space filled with potting compound.

As can also be seen from FIG. 5, the receiving space 3B in the second exemplary embodiment of the sensor housing 1B shown has, alongside the rectangular base area, a rounded indentation 18 on a front edge. Filleting 14 means that the indentation 18 does not have any sharp edges in the ascending direction either.

In an alternative exemplary embodiment of the sensor housing 1 according to the disclosure which is not shown, the receiving space 3 has at least one rounded indentation.

As can also be seen from FIGS. 1 to 5, the outwardly descending slope 12 of the circumferential edge 10, 10A, 10B in the exemplary embodiments of the sensor housing 1, 1A, 1B shown have, by way of example, a slope angle a of 45°. Depending on the other dimensions of the sensor casing 1, 1A, 1B or the dimensions of the receiving space 3, 3A, 3B, the height of the circumferential edge 10, 10A, 10B is in the range of 0.1 to 1 mm. In the first exemplary embodiment of the sensor casing 1A shown, the circumferential edge 10A has, by way of example, a height of 0.5 mm. In the second exemplary embodiment of the sensor casing 1A shown, the circumferential edge 10B has, by way of example, a height of 0.15 mm.

The exemplary embodiments of the sensor casing 1, 1A, 1B shown are preferably used for a speed sensor. In this case, the receiving space 3, 3A, 3B receives at least one electronic component of the speed sensor, which is protected by the hardened potting compound 16. In this case, the first exemplary embodiment of the sensor casing 1A according to the disclosure shown in FIGS. 1 to 4 may receive an electronic component configured as an ASIC component (ASIC: Application-Specific Integrated Circuit), for example. The second exemplary embodiment of the sensor 1B according to the disclosure shown in FIG. 5 may, for example, receive two electronic components configured as ASIC components (ASIC: Application-Specific Integrated Circuit).

The invention claimed is:

1. A sensor casing, comprising:
   a housing including at least one sidewall extending downwardly from a horizontal plane and defining in part an open receiving space; and
   a potting compound located in the open receiving space,
   wherein an outwardly descending slope surface extending downwardly from the horizontal plane and away from the open receiving space extends along the open receiving space, the outwardly descending slope surface defining in part a creep barrier configured to allow a temporary overfilling of the open receiving space during a potting process.

2. The sensor casing as claimed in claim 1, wherein:
   the at least one sidewall includes a plurality of sidewall portions; and
   each of the plurality of sidewall portions is connected to an adjacent one of the plurality of sidewall portions by a respective one of a number of fillets.

3. The sensor casing as claimed in claim 2, wherein the plurality of sidewall portions define a rectangular base area.

4. The sensor casing as claimed in claim 3, wherein the open receiving space defines at least one rounded indentation or at least one rounded projection.

5. The sensor casing as claimed in claim 1, wherein the outwardly descending slope surface defines a slope angle in a range of 20° to 70° with respect to the horizontal plane.

6. The sensor casing as claimed in claim 1, wherein the outwardly descending slope surface has a height in a range of 0.1 to 1.0 mm.

7. The sensor casing as claimed in claim 1, wherein:
the open receiving space is configured to receive at least one electronic component of a sensor, and
the potting compound is positioned in the open receiving space so as to protect the at least one electronic component when the at least one electronic component is received in the open receiving space.

8. A method for potting an open receiving space of a sensor casing which is configured according to claim 1, comprising:
filling the open receiving space with the potting compound in an unhardened state and hardening of the potting compound,
wherein the filling step includes filling the open receiving space with the unhardened potting compound until a stable convex unhardened potting compound surface is formed above the horizontal plane.

9. The sensor casing as claimed in claim 1, wherein the potting process causes the potting compound to form a stable convex unhardened potting compound surface.

\* \* \* \* \*